United States Patent [19]

Melkonian

[11] Patent Number: 5,038,945
[45] Date of Patent: Aug. 13, 1991

[54] COOKING POT LID HOLDER

[75] Inventor: Nikolai Melkonian, Tacoma, Wash.

[73] Assignee: Marketing Concepts, Inc., Tacoma, Wash.

[21] Appl. No.: 633,467

[22] Filed: Dec. 24, 1990

[51] Int. Cl.⁵ .............................................. A47F 5/00
[52] U.S. Cl. ...................................... 211/96; 211/41; 211/89
[58] Field of Search ...................... 211/41, 96, 89, 100, 211/168; 248/316.7

[56] References Cited

U.S. PATENT DOCUMENTS

| | | | |
|---|---|---|---|
| 1,065,000 | 6/1913 | Behm | 211/41 |
| 1,528,744 | 3/1925 | Dix | 211/41 |
| 2,165,654 | 7/1939 | Rosenthal | 211/96 X |
| 2,610,742 | 9/1952 | Stanton | 211/96 X |
| 2,987,193 | 6/1961 | Pajor | 211/96 X |
| 3,343,684 | 9/1967 | Galier | 248/316.7 X |
| 4,723,665 | 2/1988 | Benedict et al. | 211/96 X |

Primary Examiner—Robert W. Gibson, Jr.
Attorney, Agent, or Firm—Graybeal Jackson Richardson & Haley

[57] ABSTRACT

A cooking pot lid holder with a vertically disposed bore angularly mounting therein a plurality of bearing members in stacked relation. Each bearing member mounts, at right angles thereto, an independently movable arm. On the outer end of each arm is a pot lid knob-engaging double spring member, specifically including an arcuate first spring portion and an arcuate second spring portion facing the first spring portion. Pot lids are retained in the spring members in an upside down fashion so as to minimize dripping of condensation when so held.

8 Claims, 2 Drawing Sheets

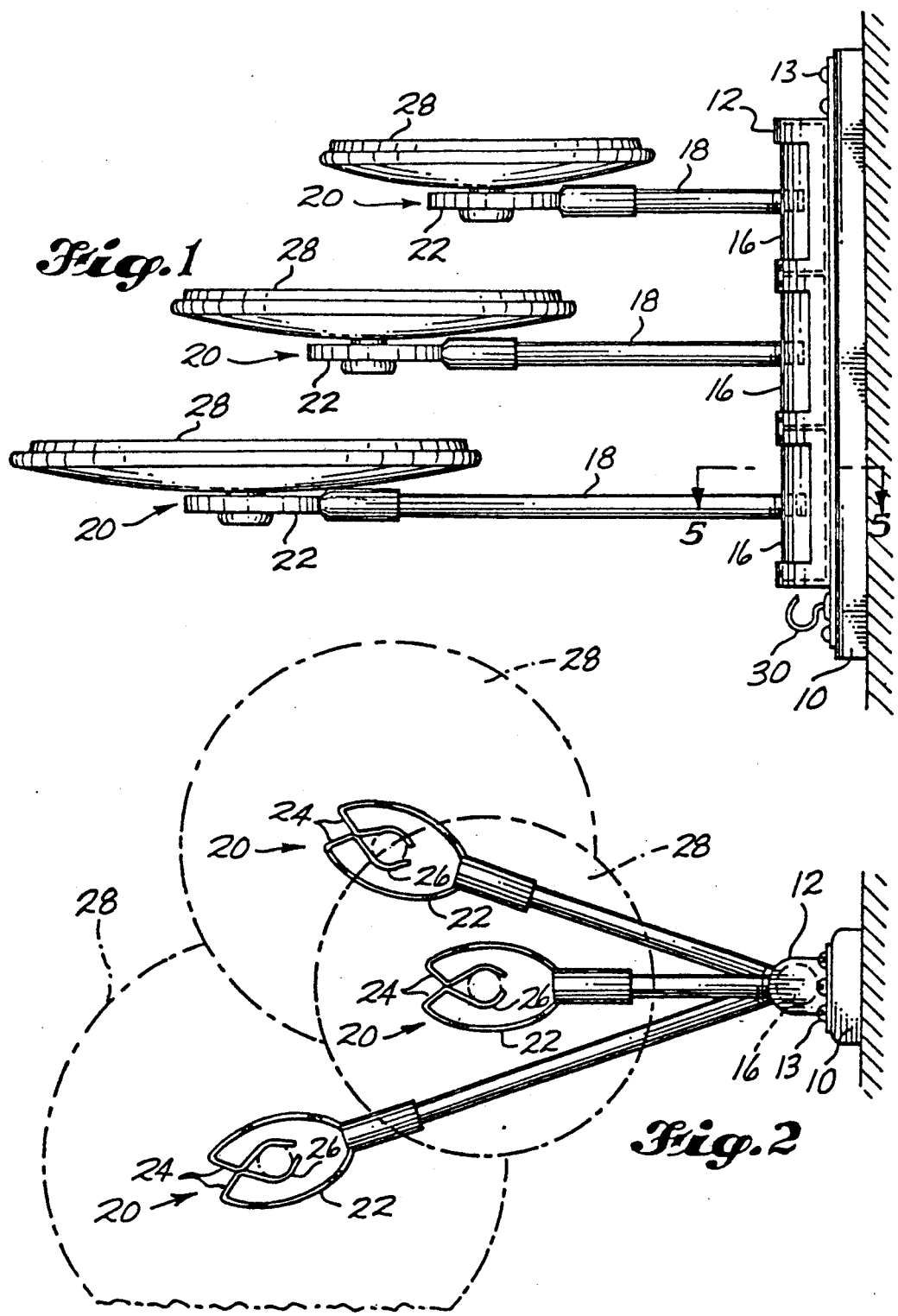

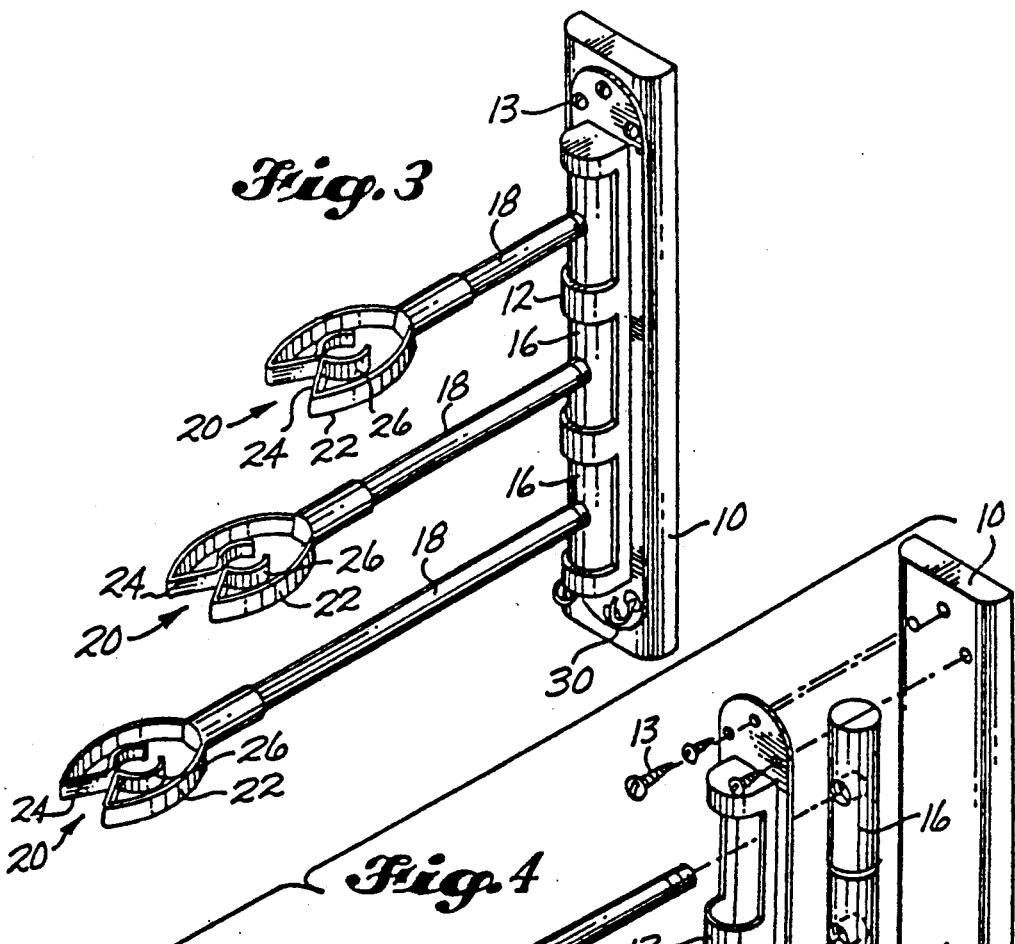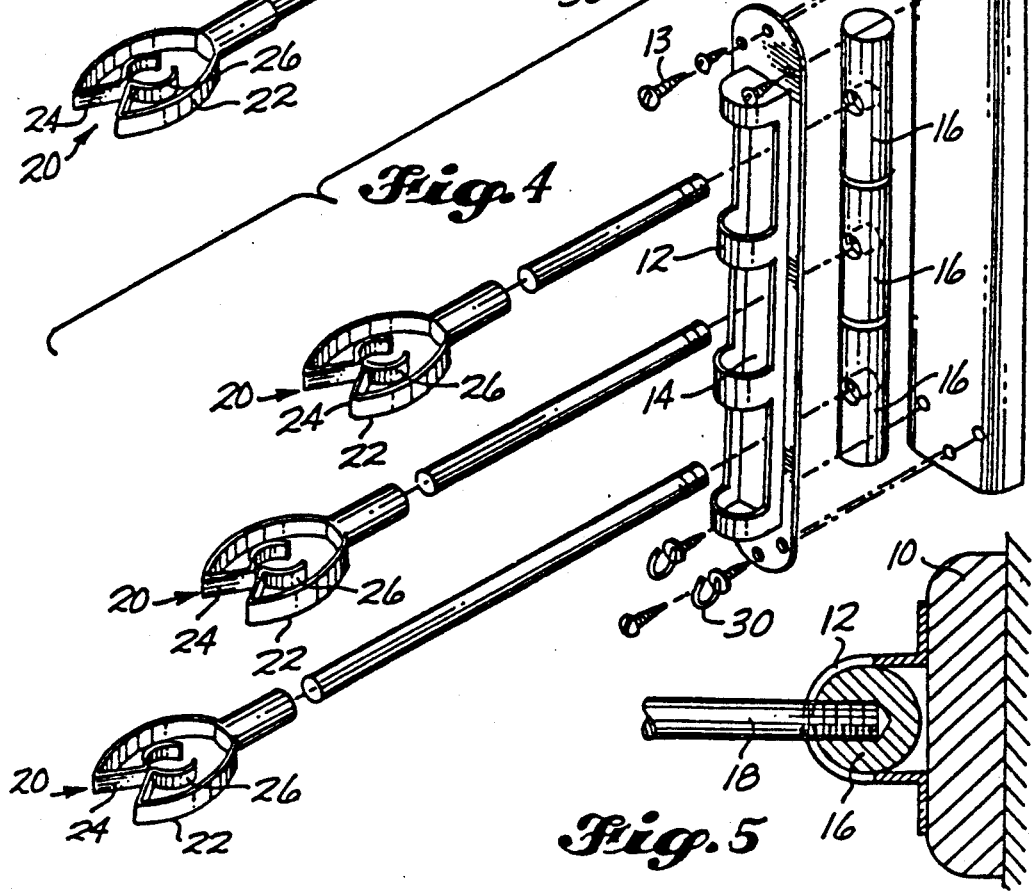

COOKING POT LID HOLDER

BACKGROUND OF THE INVENTION

When pot lids are removed from a cooking pot during or just after cooking, a hot pad is usually employed to engage the lid and to remove the same from the pot. It is the usual practice to then lay the hot pot lid aside on the stove or nearest kitchen counter top or table or other pots or pans. Often, the condensation of vapors developed during cooking and adhering to the cooking pot lid result in condensation on the lid lower surface which often drips onto the kitchen counter or table or pots or pans or sometimes on the floor. Also, the lids so haphazardly set aside were not readily available for use or reuse during cooking.

SUMMARY OF THE INVENTION

Applicant has provided a cooking pot lid holder accessory enabling cooking pot lids to be conveniently and readily stored with much less dripping and in the desired closeness to the cooking stove where the lids may be used and reused as cooking demands require.

Applicant has further designed a cooking pot lid holder device which can be wall mounted and in such close proximity to the cooking stove and cooking area so that the lids can be conveniently placed or removed while cooking as a particular recipe and cooking routine may require. Also, in small kitchens or where small counter top space is available, such as on boats, tractors, campers, and small kitchens, the utility of my invention becomes readily apparent.

If a cooking pot lid is removed from a steaming cooking kettle, the lid can be readily stored in my device and with the wet side upward, thus substantially eliminating any dripping problem from moisture condensing from steam vapors created during the cooking procedure.

Various objects, advantages, and utilities of my invention will become apparent from the following description of my invention, taken in connection with the following drawings, wherein like reference numerals refer to like parts.

BRIEF DESCRIPTION OF THE DRAWINGS

FIG. 1 is an elevational view of a device embodying my invention and with the same supporting cooking pot lids;

FIG. 2 is a plan view of my device and with the lids indicated by broken line;

FIG. 3 is a perspective view of my device;

FIG. 4 is an exploded perspective view of my device; and

FIG. 5 is a sectional view taken substantially on broken line 5—5 of FIG. 1.

DESCRIPTION OF THE PREFERRED EMBODIMENT

Referring to the drawings, a base member 10 is preferably formed of a suitable decorative material, such as oak wood or plastic. It can be well mounted by screws, preferably one on the top and one on the bottom of the base member 10. The base member 10 is provided with an internal bore or cylinder 14 for rotatively mounting therein cylindrical bearing members 16. The base member 10 is preferably mounted so that its bore 14 is vertically disposed. The bearing members 16 may be, likewise, preferably formed of a decorative material, as oak or plastic. The bearing members 16 are stacked one above the other and each is movable independently of the others. The relative sizes of the bore 14 and the bearings 16 should be such as to allow for any normal expansion or contraction and thus eliminate possible sticking or adhering restrictions upon relative motion between the parts.

Each arm 18 is connected with each associated bearing member 16. Preferably, the inner end portion of each arm 18 is threaded as shown in FIG. 4, to mate with a threaded portion in each bearing member 16. This makes the device ready to be assembled or disassembled for packing and shipping purposes. A simple friction fit is also suitable. Each of the arms 18 is, likewise, preferably formed of a suitable material such as oak or plastic. Also, any wood employed in this connection may be coated with a suitable protectorant, such as varnish.

The outer end portion of each arm 18 carries a pot lid engaging spring member, generally numbered 20. Each member 20 is secured to the outer end portion of an arm 18 by any suitable means, such as by a screw or gluing between the parts. As the arms 18 may terminate in a tubular member and the ends 20 may be formed of metal to interfit with such a tubular member, the parts can be readily glued together and the end portions 20 and the arms 18 will be permanently secured together for future use.

Each member 20 is formed of spring steel and is provided with a spring portion 22 which is preferably arcuate in shape as it extends from the arm 18. Then the portion 24 of each member 22 extends angularly inwardly to the portion 26, which portion 26 is, likewise, arcuate and is generally parallel to the portion 22. The inner terminal portions of the parts 26 do not contact each other. Thus is provided a double spring by reason of the portions 22 and 26 of each member 20. Also, each member 20 is capable of engaging individual pot lid knobs varying substantially in size due to this construction. By providing spring steel of appropriate strength and of the construction illustrated and described, the device may be used to securely hold and support pot lids of various sizes, dimensions, and weights. The hook 30 provides a device located at a convenient place to store a hot pad conveniently nereby to the point of probable use.

Also, preferably the arms 18 are different lengths, as shown, and are separately and independently movable and may assume independent angular positions, all as shown in FIG. 2 of the drawings.

From the foregoing, it will be apparent that I have provided a pot lid holder comprising a base member 10 and a tubular support 12. This support 12 is provided with a bore 14 so that bearing member 16 may be separately mounted therein and each bearing member 16 is mounted for rotary movement relative to the bore 14. In view of the fact that the base member 10 and the tubular support 12 may be secured by screen 13 so that the bore 14 is vertical, the bearing members 16 and arms 18 connected therewith can be readily independently swung to any desired angle, horizontally considered.

The double spring arrangement provided by the member 20 provides for a device which will engage and hold the knobs of pot lids over a wide variation in diameter, compared to spring member which is a single spring as distinguished from a double spring. The base member 10 and tubular support 12 provide a central bore 14 and the various bearing member 16 can be stacked in superposed relation, and each is angularly movable as respects each other and in the bore 14.

Changes may be made in the forms, dimensions, and arrangements of the parts of my cooking pot lid holder without departing from the principle thereof as defined in the following claims.

What is claimed is:

1. A cooking pot lid holder, comprising a tubular support member adapted to be mounted on a wall; a plurality of cylindrical, vertically aligned bearing members rotatively supported by said tubular support member, an arm having one end portion thereof connected with each bearing member; and a pot lid knob-engaging spring member connected with the other end portion of each arm, for engaging and retaining the handle knob of a pot lid, each said pot lid knob-engaging spring member comprising horizontally opposed arcuate clips engaging the lid knob in a clamping manner.

2. The combination of claim 1, wherein each clip part of each spring member comprises a spring segment extending outwardly from its supporting arm and a second spring segment connected with the first spring segment and thence returning in a direction toward its said supporting arm, said spring segments providing an opening therebetween of a size to snugly fit the circumference of a pot lid knob.

3. The combination of claim 1, wherein the bearing members and arms are formed of wood.

4. The combination of claim 1, wherein the bearing members and arms are formed of plastic.

5. In combination, a cooking pot lid holder as set forth in claim 1, with a cooking pot lid in an upside down attitude, retained on the holder by the knob thereof in engagement with each spring member of the holder.

6. The combination of claim 5, wherein the holder is wall mounted near a cooking stove and each arm is independently movable relative to the others, horizontally considered.

7. The combination of claim 6, comprising three horizontally extending arms.

8. The combination of claim 7, wherein each arm is a different length than the others.

* * * * *